Figure 1:
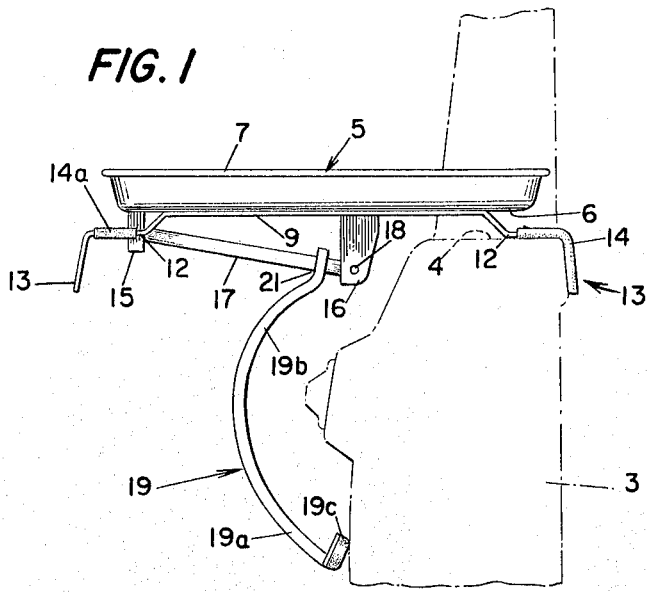

Aug. 16, 1966  J. B. LEE  3,266,443
CAR-HOP SERVING TRAY
Filed March 23, 1964

INVENTOR
*John B. Lee*
Eugene E. Stevens and/or
Raymond H. Stevens
ATTORNEYS.

United States Patent Office 3,266,443
Patented August 16, 1966

3,266,443
CAR-HOP SERVING TRAY
John B. Lee, 115 Tyler Court, Spartanburg, S.C.
Filed Mar. 23, 1964, Ser. No. 354,065
2 Claims. (Cl. 108—46)

The present invention relates to improvements in so called "car-hop" trays which are used by drive-in resturants for food and for beverage service to patrons in automobiles parked outside.

Trays of this character embody means for firmly supporting same on the window sills of automobile doors, and embody both door interior and exterior wall surface-engaging means, the means for etxerior door surface engaging usually taking the form of a horizontally pivoted prop.

However, said pivoted props of the prior art are prone to shift out of tray supporting position when in car door service with resultant spilling of the tray contents. Also known props tend to get in the way when the waitress deposits the tray on a counter, table, or other flat surface preparatory to filling a car occupant's order.

Therefore the invention has for its primary objects to (1) provide a car hop tray which will not be subject to the aforementioned objections; (2) will be of simple, inexpensive construction; and (3) can be readily applied to or removed from car door supported position.

More specifically, the invention contemplates a tray of this kind wherein a novel prop member and mounting means is provided that will assure maintenance of the prop member either in or out of car door-engaging position; and which obviates necessity for manually operable means to maintain the prop in the selected position.

A further object of the invention is to provide, in a car-hop tray, an improved tray bottom-carried mounting and positioning means for the opposite ends of the carrier bar on which the inner end of the tray-supporting prop is slidably mounted, the arrangement of parts being such that (1) only one removable fastener is required to retain the bar in place so as to facilitate assembly and disassembly of the bar and prop with the tray; and (2) so that the bar is inclined away from the tray bottom in a direction to facilitate movement of the prop in the direction of its operative tray-supporting position while tending to resist movement of the latter in the opposite direction.

Still further, the invention contemplates a means admitting of vertical rockability of the tray prop with respect to its supporting bar and combined with a prop-carried sharpened lug which bies into the bar to retain the prop in operative tray supporting position when the tray is assembled with an automobile window sill and related door or side wall.

The foregoing and other objects and advantages of the present development will be understood and appreciated as the description proceeds, reference being had to the accompanying drawings showing a now preferred form of the invention. However, the disclosures herein are to be taken as illustrative rather than limitative as the inventive concept is susceptible of other mechanical expressions within the spirit and scope of the subject matter claimed hereinafter.

In the drawings wherein the same reference characters have been used to designate the same parts wherever they appear in the several views.

Figure 2:
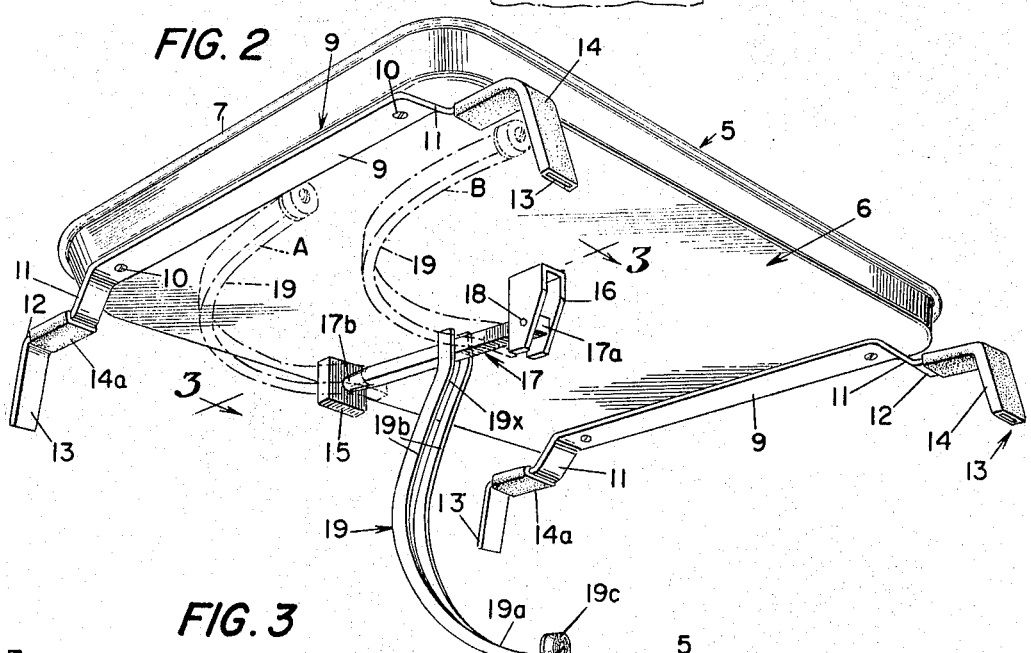
Figure 3:
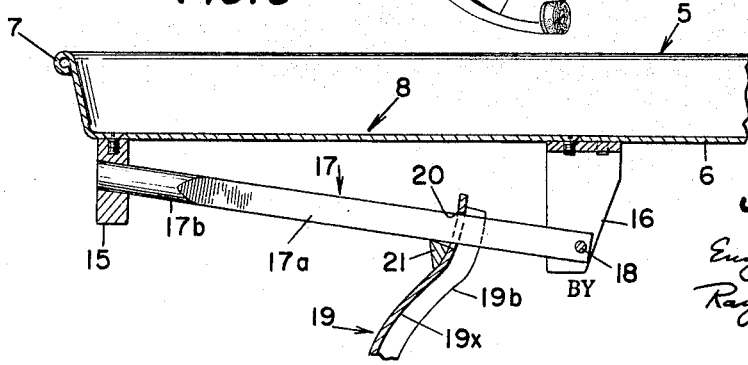

FIG. 1 is an end elevational view of the tray applied to an automobile door on the window sill thereof;

FIG. 2 is a bottom perspective view of the tray removed from the car door and showing, in full lines, its door-engaging prop in operative position, the broken line prop showings indicating firstly its inoperative position and secondly how it is adjusted from operative to inoperative position; and FIG. 3 is a section on the line 3—3 of FIG. 2 showing the prop-supporting tray-carried bar, the related prop end and the prop-carried locking tongue which engages the supporting bar.

Referring to the drawings by reference characters and turning to FIG. 1, it will be noted that the tray 5 is supported upon the window sill 4 of the automobile car door 3. FIG. 1 indicates that means, to be hereinafter described, including a prop member are employed for maintaining the tray in door sill supported position.

Tray 5 has the bottom surface 6, top surface 8, and the usual endless article-intercepting flange 7 surrounding the latter.

Turning to FIG. 2, it will be noted that the tray bottom 6 is provided adjacent each end with the parallel transversely extending stiff strip members 9 which are bent, as at 11, outwardly from the tray bottom surface 6 to provide bottom surface paralleling portions 12.

The above referred to strip portions 12 are spaced from the tray bottom 6 and terminate in out-turned legs 13 at points beyond the front and rear tray edges. Thus, said legs 13 will conveniently support tray 5 spaced above a counter, table, or other flat surface for ready removal after the waitress has finished depositing thereon an order for a car occupant outside.

Machine screws or the like 10 are employed to secure the metal or other stiff strips 9 to the bottom surface 6 of the tray inwardly of the bends 11 and inwardly of the front and rear tray margins.

In order to protect the car window sill 4 and inner surface of door 3 against scarring, I provide the innermost pair of legs 13 and adjacent portions 12 of strip members 9 with shape conforming sleeves 14 of rubber or other compressible material as indicated in FIG. 2. Since the outer pair of legs 13 and adjacent portions 12 are never in car door engagement, sleeves 14 are not required for same, but short sleeves 14a may be used on portions 12.

Coming now to the tray-sustaining prop means of FIGS. 1 and 2, it will be seen that tray bottom 6 has approximately midway between the strips 9, the outstanding posts, or the like 15, 16. The post 15 is located adjacent the outer tray edge, as seen in FIG. 1, while the post member 16 is secured to bottom surface 6 approximately midway between the front and rear tray edges. These posts 15, 16 carry the ends of a guide bar element 17 on which the prop member 19 is adjustably mounted.

It is important to note that guide bar 17 is secured to posts 15, 16 at different distances from the plane of tray bottom 6 so that said bar 17 slants away from the tray bottom 6 in the direction of post 16. Also guide bar 17 is preferably, but not necessarily, cross-sectionally square (17a) from the U-form inner post 16 for the major portion of its length and terminates in the diametrically reduced cross-sectionally round portion 17b which latter is rigidly socketed in the outer post 15. The U-form of the inner post 16 with its bight secured to tray bottom 6 is of particular advantage in that the free terminal of square, or other non-rounded bar portion 17a can be conveniently secured between the U-arms by pin 18 after the bar end 17b has been passed between said U-arms and socketed in post 15. The advantages of the slanted bar 17 aside from its described formation will be readily understood. In order words the slant of the bar 17 tends to facilitate movement of the prop 19 to operative position but resists movement away from such position by reason of the upward slant of bar 17.

The prop member 19 incidently referred to heretofore is slidable on square bar portion 17a and is both slidable and laterally rockable on the rounded bar portion 17b so that it can assume its several portions on bar 17 that are indicated in FIG. 2. Thus in carryout the invention, the prop member 19 will preferably be of channel form in cross-section and of longitudinally curved but general L-form so as to provide a leg portion 19b whose free end is slidable on bar 17; and a foot portion 19a. The foot portion 19a has a cushioned end member 19c for engagement with the exterior of the car door 3 below the sill 4 thereof, and the outward curve of 19 enables adjacent leg and foot portions 19b, 19a to clear the ornamental door-carried chrome strip section outward door bulge 3a.

Being channel form in cross-section the prop 19 provides the bight wall 19x which, in the present drawing, has the longitudinally extending rectangular hole 20 which slidably—and vertically rockably (but non-swingably)—receives the squared portion 17a of bar 17. However, prop 19 is swingable about the reduced and rounded bar portion 17b to the dotted line position A of FIG. 2 and can thereafter be slid inwardly to out-of-use position B of FIG. 2.

From the plane of the lower edge of the bight-provided rectangular prop hole 20 extends the co-planar top surface of the bight carried outwardly projecting sharp outer ended lug 21 which bites into the proximate surface of bar portion 17a to retain it in the FIG. 1 position. Part of lug 21 is preferably formed by an outstruck portion of bight 19x with reinforcing metal later supplied.

The channel form of prop member 17 is of particular advantage because the side walls of same opposite bight hole 20 sustain the foot portion against sideward movement while saving unnecessary expense in metal for prop 19.

Also, as will be apparent from an inspection of FIG. 1, the slant of guide bar 17 toward outer post 15 from inner post 16 furthers the holding efficiency of the guide bar-engaging edge of lug 21 with guide bar 17 in the operative FIG. 1 position of the latter.

The device involves but few simply arranged parts and involves no manually operative means for tightening or securing the prop member in either the full line position of FIGS. 1 and 2 or in the dotted position B of FIG. 2.

Having thus described the invention, what is claimed is:

1. In an automobile drive-in-restaurant service tray for application to an automobile door and characterized by a tray-form body providing top and bottom surfaces, ends and front and rear edges; a fixedly depending tray bottom carried leg adjacent each tray side and located inwardly of the front tray edge, tray bottom-provided surface portions and the outer surfaces of said legs when the tray is applied to a car door being respectively engageable with the door window sill and subjacent inner automobile door surfaces when the tray is applied thereto for service to car occupants, there being a depending tray bottom-carried prop intermediate the tray ends for outer door surface engagement to cooperate with said legs and tray bottom portions in the support of the tray when the latter is applied to a car door window sill with the outer surfaces of said legs engaging the inner car door surface; the improvement in said prop and its supporting means which comprises a generally L-form prop member having outwardly curved inner leg portion and an inwardly curved outer foot portion so as to provide an outer bulge for clearing away outer door surface projection, said prop being U-shaped in a cross-section to provide side walls and a bight wall which latter is disposed toward the outer tray edge when the tray is applied to a car door, a prop-mounting bar providing a flat sided lineal portion extending inwardly from a point adjacent to but spaced from its outer end adjacent the outer tray edge, said mounting bar slidably supporting said prop, tray bottom-carried means supporting the mounting bar ends and inclining said mounting bar away from the tray bottom in the direction of the inner tray edge, said prop having a bar-receiving hole in its bight portion adjacent the inner bar end, said hole being of a width substantially conforming to the transverse cross-section of the flat sided bar portion but of a depth longitudinally of the prop that is greater than the bar member cross-section in that direction, whereby the prop is both non-rotatably slidable and vertically rockable on said flat sided bar portion, an out-struck lug provided by the bight portion of said prop and extending from the plane of the inner transverse end of said bar-receiving hole, said lug having a sharpened outer end edge for locking engagement with the proximate top surface of the bar when the prop is rocked outwardly away from a car door, the inward slant of said bar away from the tray bottom facilitating movement of the prop to operative tray-supporting position thereon while resisting prop movement in the opposite direction, and said mounting bar being diametrically reduced and rounded adjacent its outer end support whereby the prop can be rotated thereabout to a tray bottom paralleling position or to a position perpendicular thereto.

2. The structure of claim 1, and the tray bottom-carried mounting means for the prop comprising a post adjacent the outer tray edge, a seat-providing recess receiving the rounded outer end of the bar, said seat being inclined away from the plane of the tray bottom toward the inner edge thereof, a side wall-providing tray bottom carried U-form member receiving the inner end of said bar between the side walls thereof, and a removable pin element extending through the said side walls and related bar end as the sole means for preventing removal of said bar from said mounting means.

References Cited by the Examiner

UNITED STATES PATENTS

| | | | |
|---|---|---|---|
| 1,843,391 | 2/1932 | Gayle | 108—47 X |
| 1,934,271 | 11/1933 | McGinley | 108—46 X |
| 1,952,377 | 3/1934 | Lack | 108—47 |
| 2,049,386 | 7/1936 | Temperli | 108—44 X |
| 2,246,432 | 6/1941 | Cohen | 108—47 |
| 2,296,028 | 9/1942 | Gibble | 108—46 X |
| 3,009,750 | 11/1961 | Hendricks | 108—47 X |

FRANK B. SHERRY, *Primary Examiner.*

G. O. FINCH, *Assistant Examiner.*